(12) United States Patent
Isenhour et al.

(10) Patent No.: US 9,904,024 B2
(45) Date of Patent: Feb. 27, 2018

(54) LENS ASSEMBLIES AND OPTICAL CONNECTORS INCORPORATING THE SAME

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: Corning Optical Communications LLC, Hickory, NC (US)

(*) Notice: Subject to any disclaimer, the term of this patent is extended or adjusted under 35 U.S.C. 154(b) by 204 days.

(21) Appl. No.: 14/018,567

(22) Filed: Sep. 5, 2013

(65) Prior Publication Data

US 2015/0063764 A1    Mar. 5, 2015

(51) Int. Cl.
| | |
|---|---|
| *G02B 6/32* | (2006.01) |
| *G02B 6/42* | (2006.01) |
| *G02B 7/00* | (2006.01) |
| *B29D 11/00* | (2006.01) |
| *G02B 19/00* | (2006.01) |
| *G02B 7/02* | (2006.01) |
| *B29K 79/00* | (2006.01) |
| *B29K 709/08* | (2006.01) |
| *B29K 105/00* | (2006.01) |

(52) U.S. Cl.
CPC ...... *G02B 6/4267* (2013.01); *B29D 11/00298* (2013.01); *G02B 6/325* (2013.01); *G02B 6/4204* (2013.01); *G02B 6/4228* (2013.01); *G02B 6/4249* (2013.01); *G02B 6/4292* (2013.01); *G02B 7/003* (2013.01); *G02B 7/028* (2013.01); *G02B 19/0014* (2013.01); *G02B 19/0057* (2013.01); *B29K 2079/085* (2013.01); *B29K 2105/253* (2013.01); *B29K 2709/08* (2013.01); *B29K 2995/0018* (2013.01); *Y10T 156/1043* (2015.01)

(58) Field of Classification Search
CPC .. G02B 6/4267; G02B 6/4204; G02B 6/4228; G02B 6/425; G02B 7/003; G02B 7/028; G02B 19/0014; G02B 19/0057; B29D 11/00298
USPC .............. 385/33, 93; 359/811, 820; 264/1.7, 264/1.37; 156/221
See application file for complete search history.

(56) References Cited

U.S. PATENT DOCUMENTS

| | | | |
|---|---|---|---|
| 5,064,712 A | 11/1991 | Fretz, Jr. .................... 428/212 |
| 5,232,637 A | 8/1993 | Dasher et al. .................. 264/1.3 |

(Continued)

*Primary Examiner* — Jerry Blevins
(74) *Attorney, Agent, or Firm* — Michael E. Carroll, Jr.

(57) ABSTRACT

Lens assemblies including a substrate and a plurality of mechanically isolated lenses coupled to the substrate are disclosed. The substrate may have a low coefficient of thermal expansion. Optical connectors including the lens assemblies described herein, as well as methods of fabricating a lens assembly, are also disclosed. In one embodiment, a lens assembly includes a substrate having a first surface, and a lens layer including a plurality of lenses. A coefficient of thermal expansion of the substrate is different from a coefficient of thermal expansion of the plurality of lenses. The lens layer is coupled to the first surface of the substrate, and each lens of the plurality of lenses is mechanically isolated from adjacent lenses of the plurality of lenses by gap regions within the lens layer.

15 Claims, 6 Drawing Sheets

(56) References Cited

U.S. PATENT DOCUMENTS

| | | | | |
|---|---|---|---|---|
| 5,274,008 A | * | 12/1993 | Lai | 523/107 |
| 5,359,684 A | * | 10/1994 | Hosokawa | G02B 3/08 |
| | | | | 385/129 |
| 2009/0009876 A1 | * | 1/2009 | Nomura | G02B 3/0012 |
| | | | | 359/622 |
| 2011/0249449 A1 | | 10/2011 | Tashiro | 362/311.04 |
| 2012/0206641 A1 | * | 8/2012 | Baba | 348/360 |
| 2012/0242814 A1 | * | 9/2012 | Kubala | B26F 1/38 |
| | | | | 348/76 |
| 2014/0056591 A1 | * | 2/2014 | McColloch | 398/135 |

\* cited by examiner

LENS ASSEMBLIES AND OPTICAL CONNECTORS INCORPORATING THE SAME

BACKGROUND

The disclosure generally relates to lens assemblies and, more particularly, to optical connectors and lens assemblies having mechanically isolated polymer lenses.

Benefits of optical fiber include extremely wide bandwidth and low noise operation. Because of these advantages, optical fiber is increasingly being used for a variety of applications, including, but not limited to, broadband voice, video, and data transmission. Additionally, optical cable assemblies may be utilized in consumer electronics applications to transfer data between electronic devices.

Optical connectors are employed in both optical cable assemblies and electronic devices to provide an optical-to-optical connection wherein optical signals are passed between an optical cable assembly and an electronic device. Optical connectors commonly use lenses to direct optical signals into photodiodes to convert the optical signal into an electrical signal, as well as to direct optical signals emitted from a laser diode or the like into a mated optical connector. Glass lens assemblies are desired because of the coefficient of thermal expansion match with that of the active optical components (e.g., laser diode, photodiodes) to which the lenses are aligned as well as with that of the substrate to which the active optical components are mounted. However, a monolithic, molded glass lens array may be challenging and/or cost prohibitive with respect to most applications because of the high temperatures needed to process the glass.

SUMMARY

Embodiments are directed to lens assemblies and optical connectors, such as optical connectors utilized by optical cable assemblies and electronic devices, wherein electrical signals generated by a host or client electronic device are converted to optical signals by a transceiver circuit and transmitted over one or more optical fibers. In the embodiments described herein, a lens assembly, as well as the optical connectors incorporating the same, comprises a plurality of polymer lenses coupled to a surface of a substrate having a coefficient of thermal expansion that substantially matches the component substrate to which the active optical components are mounted. However, the coefficient of thermal expansion difference between the polymer material of the lenses and the substrate to which they are coupled may cause a uniform polymer sheet containing the lenses to expand and contract over the large operating temperature range of the optical connector. The relatively large surface area may cause the bond between the lens layer and the substrate to break. Further, movement of the lens layer may cause the lenses to become misaligned with respect to the active optical components, thereby causing optical loss.

In the embodiments described herein, each lens of the plurality of lenses is mechanically isolated from adjacent lenses. In this manner, the expansion and contraction of individual lenses is not cumulative such that the movement of each lens does not affect the position of adjacent lenses. Accordingly, the polymer-substrate lens assembly functions as a low coefficient of thermal expansion material.

In one embodiment, a lens assembly includes a substrate having a first surface, and a lens layer including a plurality of lenses. A coefficient of thermal expansion of the substrate is different from a coefficient of thermal expansion of the plurality of lenses. The lens layer is coupled to the first surface of the substrate, and each lens of the plurality of lenses is mechanically isolated from adjacent lenses of the plurality of lenses by gap regions within the lens layer.

In another embodiment, a method of fabricating a lens assembly includes coupling a lens layer to a first surface of a substrate, wherein the lens layer comprises a plurality of lenses, and a coefficient of thermal expansion of the substrate is different from a coefficient of thermal expansion of the plurality of lenses. The method further includes singulating individual lenses of the plurality of lenses by removing lens layer material between adjacent lenses, thereby forming gap regions that mechanically isolate each lens from adjacent lenses.

In yet another embodiment, an optical connector includes a connector body having a mating face, a plurality of optical components aligned with the at least one connector alignment feature, and a lens assembly disposed within the mating face. The lens assembly includes a substrate comprising a first surface, and a lens layer including a plurality of lenses. A coefficient of thermal expansion of the substrate is different from a coefficient of thermal expansion of the plurality of lenses. The lens layer is coupled to the first surface of the substrate, and each lens of the plurality of lenses is mechanically isolated from adjacent lenses of the plurality of lenses by gap regions within the lens layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments are directed to lens assemblies and optical connectors, such as optical connectors utilized by fiber optic cable assemblies and electronic devices, wherein electrical signals generated by a host or client electronic device are converted to optical signals by a transceiver circuit and transmitted over one or more optical fibers. Optical signals received by a host or client electronic device are converted from optical signals into electrical signals by the transceiver circuit. Transceiver circuits may include active optical components such as laser diodes or vertical-cavity surface-emitting lasers (VCSEL) for transmission of optical signals and photodiodes for the receipt of optical signals). The optical connectors disclosed herein may allow for high-speed communication to and/or from an electronic device. Conventional copper connectors and cabling are reaching bandwidth limitations as bandwidth requirements are ever increasing due to data-intensive applications, such as cloud computing, high definition television, ultra high definition television, and the like.

The optical connectors described herein utilize lens assemblies having a plurality of lens to direct optical signals to and from optical components, such as active optical components that define the transceiver circuit within the connector body. For example, lenses may be used to condition (i.e., focus, expand or collimate) optical signals emitted from a laser diode or VCSEL within a device to a corresponding lens of a mated device for possible transmission over an optical fiber. Lenses may also be used to receive optical signals from a mated device and condition the same to be received by photodiodes within the device. Other optical components include, but are not limited to, optical fibers, fiber stubs, and optical waveguides.

In the embodiments described herein, the lens assembly comprises a substrate with a lens layer comprising polymer lenses coupled thereto. As described in detail below, the lenses of the lens assembly are separated by gap regions to prevent expansion and contraction of the lenses due to thermal mismatch between the substrate and the lens layer from causing optical misalignment and to prevent the lens layer from being separated from the substrate. Various embodiments of lens assemblies, optical connectors, and methods of fabricating lens assemblies are described in detail below.

Figure 1A:
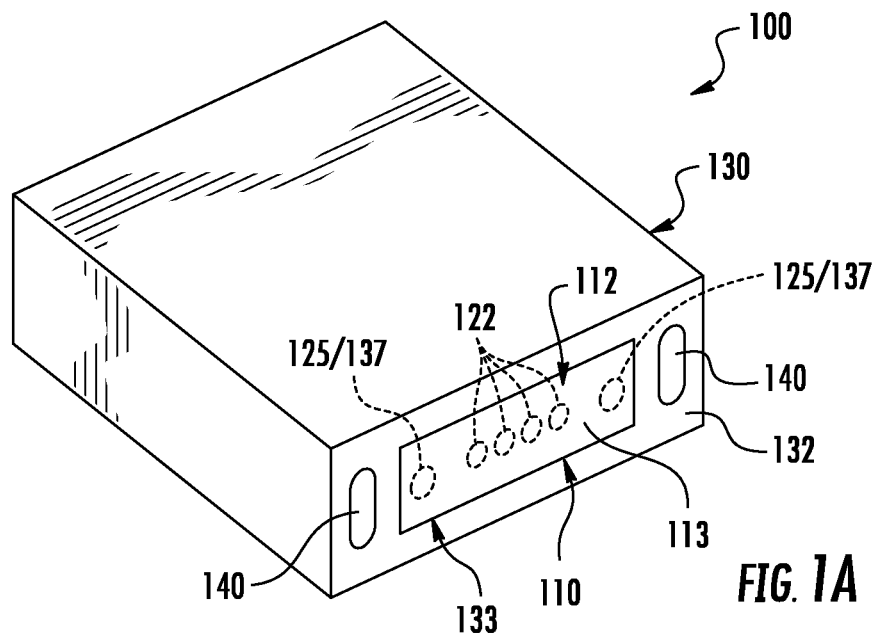
FIG. 1A is a front perspective view of an example optical connector according to one or more embodiments of the disclosure.
Figure 1B:
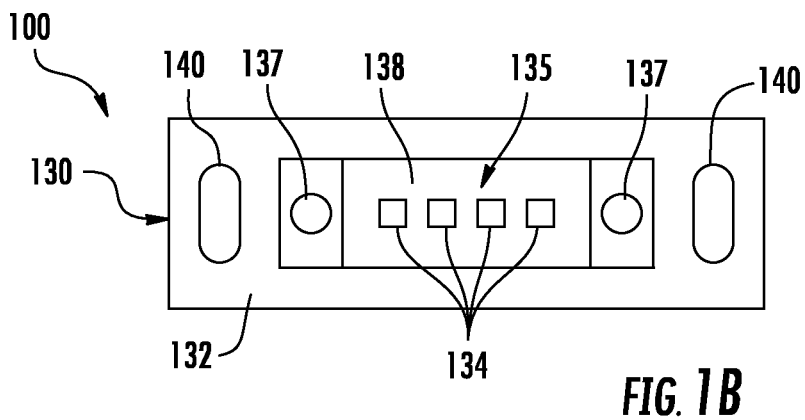
FIG. 1B is a front view of the example optical connector depicted in FIG. 1A with the lens assembly removed.

Referring initially to FIGS. 1A and 1B, a schematic illustration of an example optical connector 100 is depicted. FIG. 1A is a perspective view of the optical connector 100, while FIG. 1B is a front view of the optical connector with the lens assembly 110 removed. The illustrated optical connector 100 may be disposed in an electronic device, such as a laptop computer, a tablet computer, a smart phone, a desktop computer, an external storage device, a camera, and the like. The optical connector 100 may also be a portion of an optical cable assembly configured to enable optical communication between coupled electronic devices over optical fibers.

Generally, the optical connector 100 comprises a connector body 130, coupling features 140, and a lens assembly 110. The optical connector 100 further includes a transceiver circuit 135 within the connector body 130. The connector body 130 may be fabricated from any suitable material, such as a molded thermoplastic, for example.

The lens assembly 110 is disposed within a mating face 132 of the connector body 130. For example, the lens assembly 110 may be disposed within an opening 133 of the mating face 132. The lens assembly 110 comprises a substrate 112 having a first surface 113 and a lens layer comprising a plurality of lenses 122 coupled to a second surface of the substrate 112. The lenses 122 are disposed within a connector body recess 131 defined by the connector body 130 and the substrate 112. As described in more detail below, the substrate may be made of any relatively low coefficient of thermal expansion ("CTE") material, such as a glass material. The lens layer and respective lenses 122 are molded from a polymer material that is optically transmissive to the wavelength of the optical signals. Nonlimiting examples of the lens layer material include polyethermides (e.g., Ultem manufactured by SABIC), cyclo olefin polymers (e.g., Zeonex manufactured by Zeon Chemicals L.P.), and polycarbonate materials.

Each lens 122 is mechanically isolated from adjacent lenses to prevent additive stress due to thermal mismatch between the material of the lenses 122 and the material of the substrate 112. Aspects of the lens assembly 110 and methods of its fabrication are described in detail below.

The coupling features 140 may be any features that mate with a mated optical connector, and may include, but are not limited to, alignment pins, bores, magnets and the like. The coupling features 140 may assist in providing alignment between lenses of mated optical connectors.

Figure 2:
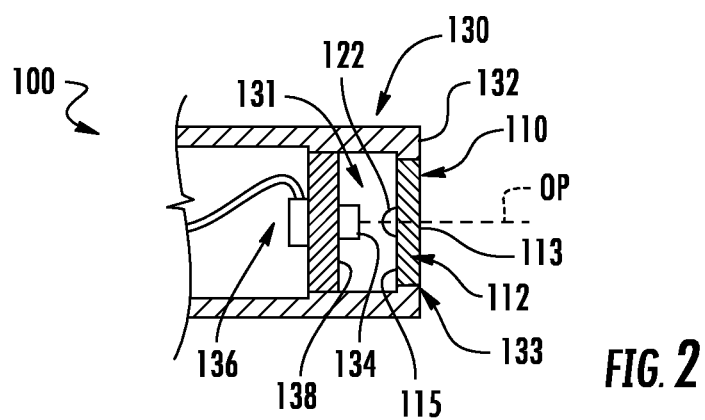
FIG. 2 is a cross sectional side view of an example optical connector according to one or more embodiments of the disclosure.

Referring now to FIG. 2, a cross sectional view of the optical connector 100 depicted in FIGS. 1A and 1B is illustrated. It should be understood that the arrangement of the components depicted in FIG. 2 is for illustrative purposes only, and that many other component arrangements are possible. The lens assembly 110 is disposed within an opening 133 of the mating face 132 portion of the connector body 130. In the illustrated embodiment, the first surface 113 of the substrate 112 is substantially planar with respect to the mating face 132 portion of the connector body 130; however, embodiments are not limited thereto. In other embodiments, the first surface 113 of the substrate 112 may either protrude or be recessed with respect to the mating face 132.

The lenses 122 are disposed on the second, interior surface 115 of the substrate 112 and reside in a connector body recess 131 defined by the connector body 130 and the substrate 112. Also disposed within the connector body recess 131 is a component substrate 138 on which active optical components 134 of the transceiver circuit 135 are mounted. By way of example, the active optical components 134 may include laser diodes and/or photodiodes for the transmission and receipt of optical signals. In some embodiments, the component substrate 138 comprises silicon, such that the component substrate 138 and the active optical components 134 are configured as an integrated photonics assembly. In other embodiments, the component substrate 138 is configured as a circuit board, such as a printed circuit board (e.g., FR-4).

The lenses 122 are aligned with the active optical components 134 on an optical path OP. The substrate 112 on which the lenses 122 are disposed should be a low CTE material to substantially match the CTE of the component substrate 138. Matching the CTE of the substrate 112 to that of the component substrate 138 mitigates misalignment of the lenses 122 with respect to the active optical components 134 due to thermal expansion and contraction. In some embodiments, the substrate 112 is fabricated from a glass material, such as, without limitation, soda-lime glass, aluminosilicate glass, and borosilicate glass. Other low CTE materials having a CTE close to that of the component substrate 138, and are transmissive to the optical signals, may be used.

Connector alignment features 137 within the connector body 130 and alignment features 125 on the substrate 112 may be provided to ensure proper alignment between the active optical components 134 and the lenses 122. For example, the connector alignment features 137 may be bores that respectively receive alignment features 125 configured as posts on the lens assembly 110 (see FIGS. 1B and 3). It should be understood that other alignment structures and configurations may be utilized.

Although the optical connector 100 depicted in FIG. 2 has an in-line optical path OP (i.e., a linear optical path without optical turns), embodiments are not limited thereto. For example, the optical connector 100 may comprise one or more reflective surfaces such that the optical signals propagating therein make one or more turns within the optical connector 100. In some embodiments, the optical signals may be turned by a total internal reflection surface.

An example electrical connector 136 connected to the component substrate 138 is also depicted in FIG. 2. The electrical connector 136 may pass electrical signals to and from the transceiver circuit defined by the active optical components 134. The electrical connector 136 may be further connected to other circuits within the electronic device, for example. It should be understood that the electrical connector may not be provided in other embodiments, and that other electrical connections are also possible, such as lead frame electrical connections or wire bonds.

Figure 3:
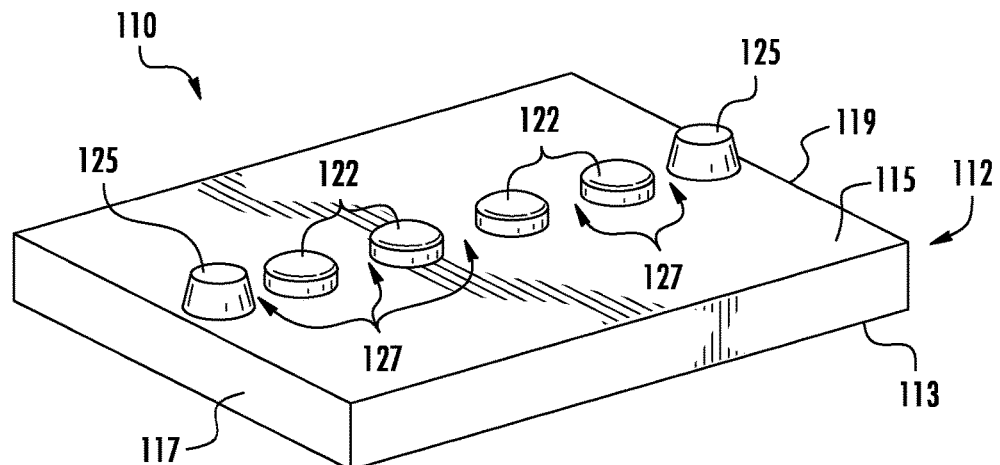
FIG. 3 is a top perspective view of an example lens assembly according to one or more embodiments of the disclosure.

Embodiments of the lens assembly 110 and methods of its fabrication will now be described in detail. Referring to FIG. 3, a completed lens assembly 110 according to one embodiment is illustrated. As described above, a plurality of molded lenses 122 are coupled to a second surface 115 of the substrate 112. In some embodiments, the first surface 113 of the substrate 112 is treated with a coating, such as an anti-reflective coating, for example.

In the illustrated embodiment, four lenses 122 are arranged in a single row array. The lenses 122 are molded from a polymer material, and may take on any shape depending on the application. In the illustrated embodiment, the lenses 122 are configured as precision molded polymer aspheric lenses. The lenses 122 are separated by gap regions 127 that provide mechanical isolation. It should be understood that more or fewer lenses 122 may be provided in any number of configurations. For example, the lenses 122 may be arranged more than one row, or in a circular configuration.

The illustrated embodiment of FIG. 3 further includes two alignment features 125 in the form of posts located on opposite sides of the lenses 122. For example, one alignment feature 125 may be located proximate a first edge 117 of the substrate 112, while a second alignment feature 125 may be located proximate a second edge 119 opposite from the first edge 117. Although the lenses 122 may be integral with the substrate 112, in some embodiments the alignment features 125 are fabricated from the same polymer material as the lenses 122. The alignment features 125 may mate with corresponding connector alignment features 137 within the connector body 130 to align the lenses 122 with the active optical components 134. It should be understood that more or fewer alignment features 125 may be provided in shapes and arrangements other than that depicted in FIG. 3. Additionally, in other embodiments no alignment features may be provided.

The lenses 122 and the alignment features 125, if provided, have a different coefficient of thermal expansion ("CTE") from that of the underlying substrate 112. Accordingly, the lenses 122 may expand and contract over an operating temperature of the optical connector 100. As an example and not a limitation, the operating temperature range of the optical connector 100 may be from about −40° C. to about 110° C.

Figure 4:
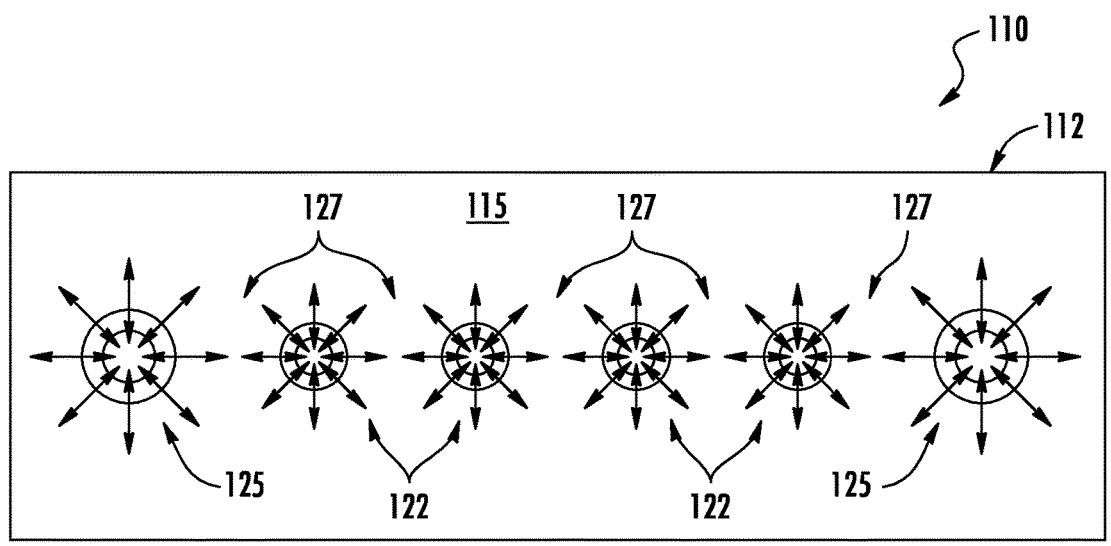
FIG. 4 is a top-down view of the example lens assembly depicted in FIG. 3 with directional arrows illustrating expansion and contraction of the lenses and alignment features.

Referring now to FIG. 4, radial expansion and contraction of the lenses 122 and the alignment features 125 with respect to substrate 112 is schematically depicted by directional arrows. In the embodiments described herein, the lenses 122 (and alignment features 125, if provided) are mechanically isolated from one another by gap regions 127 so that the stress caused by the CTE mismatch between the polymer material of the lenses 122 and the alignment features 125 and the substrate 112 is not additive therebetween. Mechanical isolation between adjacent lenses 122 and alignment features 125, if provided, prevents stress caused by the CTE mismatch from breaking the adhesive bond (or other bond) between the lenses 122/alignment features 125 and the substrate 112.

The mechanical isolation between the lenses 122 provided by the gap regions 127 also prevents the lenses 122 from moving out of optical alignment with respect to the active optical components 134 due to additive movement between lenses 122 caused by the CTE mismatch. In this manner, by making the lenses 122 independent, the radial expansion and contraction may be negligible in terms of the impact on optical loss.

As an alternative to gap regions 127 wherein the lens layer material is fully removed or otherwise absent, in some embodiments a thin web of polymer material is present between the lenses 122. In such embodiments, the lenses 122 are not fully mechanically isolated. Thermally induced stress may accumulate within the lens layer over the operating temperature range of the optical connector 100; however the reduced thickness of the polymer material between the lenses 122 may reduce the thermally induced stress to an acceptable level. A thickness of the thin web portion should be chosen to balance the need to alleviate thermal induced stress with any fabrication considerations (e.g., molding process considerations).

Figure 5A:
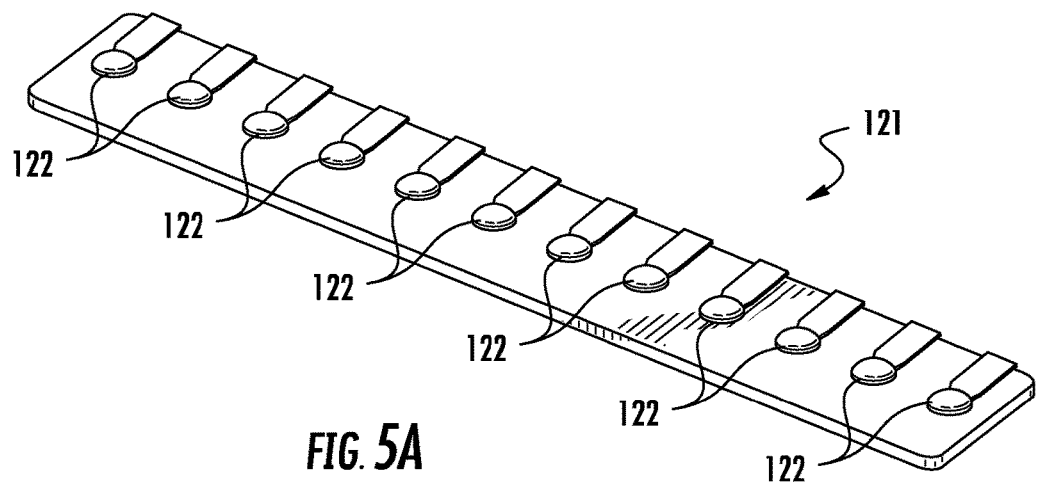
FIG. 5A is a top perspective view of a lens layer mother sheet according to one or more embodiments of the disclosure.
Figure 5B:
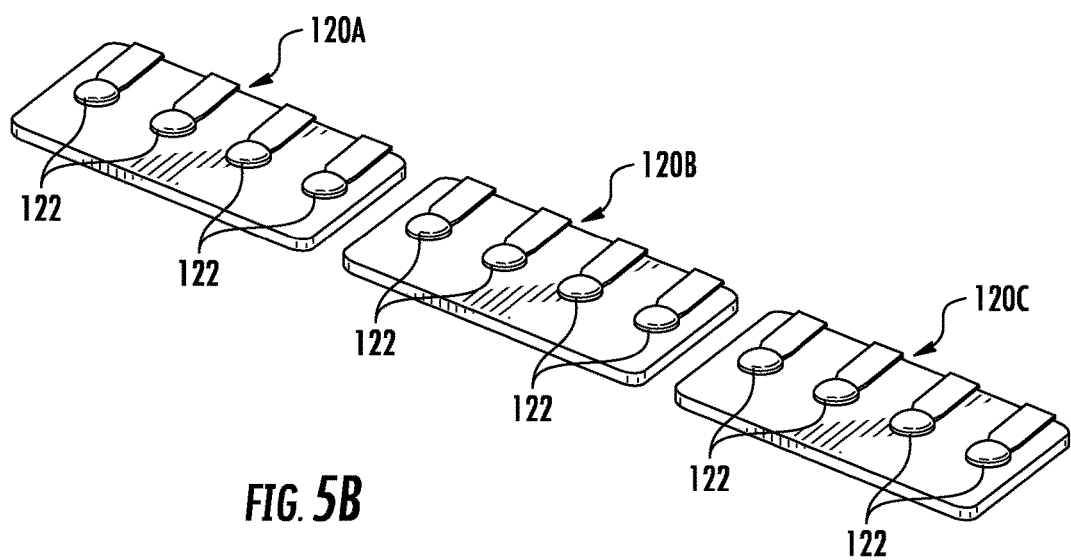
FIG. 5B is a top perspective view of three lens layers separated from the lens layer mother sheet depicted in FIG. 5A.

Methods of fabricating a lens assembly 110 will now be described. In one embodiment, the lenses 122 are provided in a lens layer. FIG. 5A depicts a mother sheet 121 of lens layer material that may be diced into individual lens layers (e.g., lens layers 120A-120C shown in FIG. 5B) having a desired size and number of lenses. The mother sheet 121 and lenses 122 may be fabricated by a precision molding process, for example. As described above, the mother sheet 121 may be made of a polymer material, such as, without limitation, a Ultem resin. However, any polymer material that is optically transmissive to the optical signals may be utilized. The mother sheet 121 may be diced or otherwise separated by a variety of methods including, without limitation, laser separation, mechanical separation (e.g., by blade) and chemical etching. It is noted that in other embodiments, the lens layer 120 may be molded into the desired size and shape so that the separation step is not required.

Figure 6A:
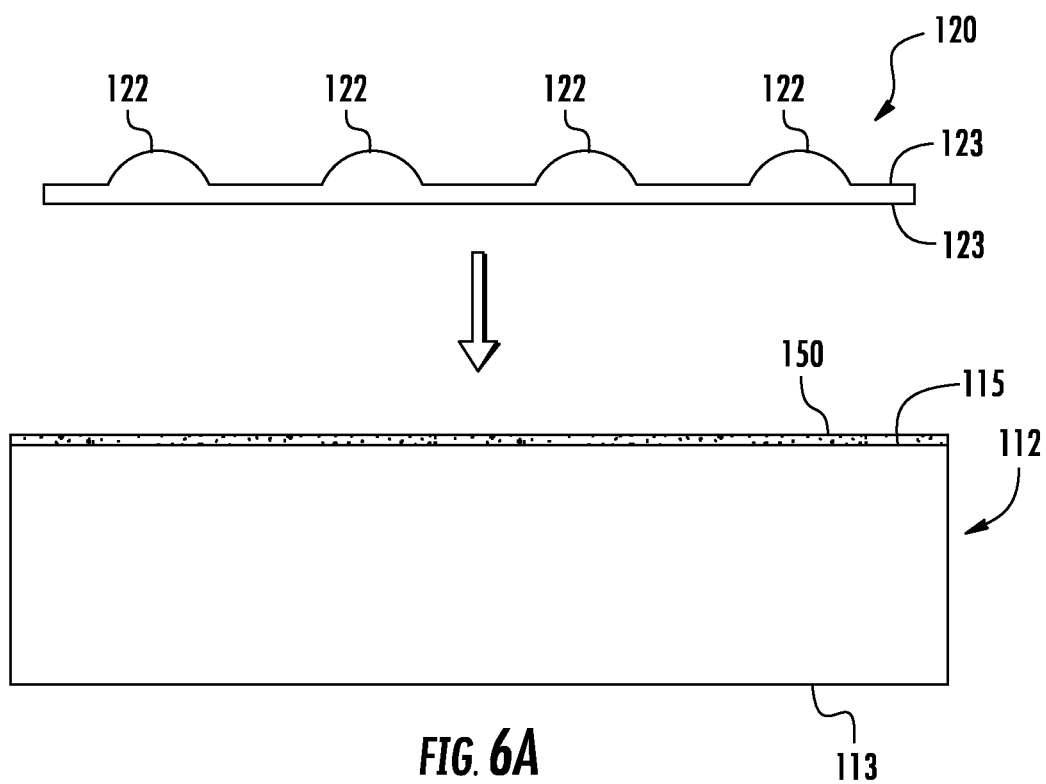
FIG. 6A schematically depicts an example lens assembly prior to being coupled to an example substrate by an adhesive according to one or more embodiments of the disclosure.
Figure 6B:
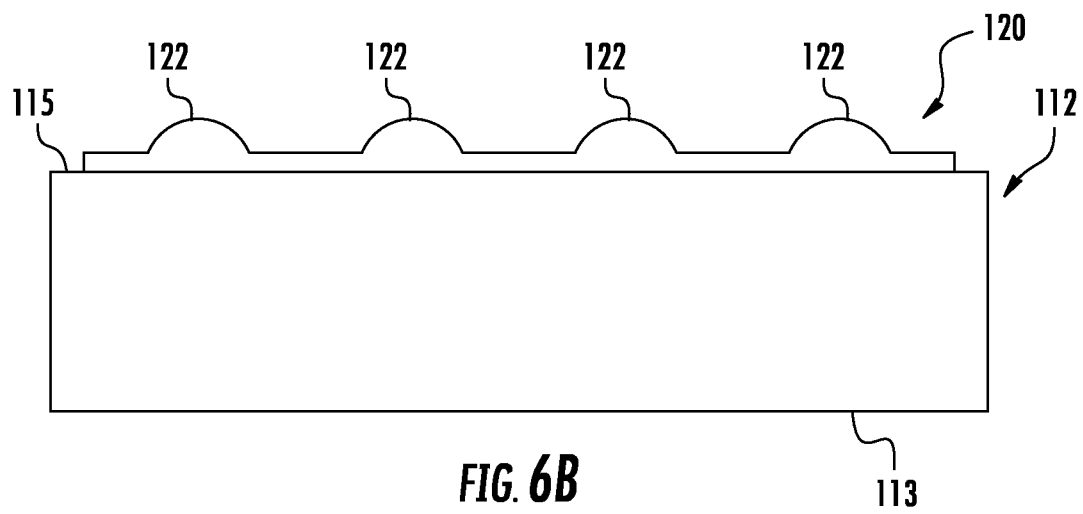
FIG. 6B schematically depicts the example lens assembly bonded to the example substrate depicted in FIG. 6A.

Referring now to FIG. 6A, the lens layer 120 may be bonded to the second surface 115 of the substrate 112. It is noted that the lens layer 120 may also include alignment features 125 as described above, although they are not depicted in FIGS. 6A and 6B. In some embodiments, an adhesive layer 150 is provided on the second surface 115 and/or an underside surface 123 of the lens layer 120 to bond the lens layer 120 to the substrate 112. Any appropriate adhesive material may be used. The adhesive material chosen should be optically transmissive to the optical signals propagating through the lens assembly 110. In some embodiments, the adhesive material is an ultraviolet curable optical adhesive. FIG. 6B depicts the lens layer 120 following the bonding process.

In other embodiments, the lens layer 120 is coupled to the substrate 112 by an insert molding process rather than by adhesive bonding. Accordingly, the substrate 112 may be coupled to the lens layer 120 during the molding of the lens layer 120 and respective lenses 122.

As shown in FIGS. 6A and 6B, each lens 122 is connected to an adjacent lens 122 by lens layer material. If the lenses 122 are left connected, the CTE mismatch between the lens layer 120 material and the substrate 112 may cause stress to build up, thereby potentially causing the lens layer 120 to separate from the substrate 112 or causing the lenses 122 to be misaligned with respect to the active optical components 134.

In the embodiments described herein, gap regions 127 are formed between the lenses 122 (and alignment features 125, if provided) to mechanically isolate the lenses 122 from one another, and obviate the CTE mismatch between the lens layer material and the material of the substrate 112. In some embodiments, the lens layer 120 is a fully contiguous sheet of lens layer material, while in other embodiments some of the gap regions 127 described below may be fabricated during the molding process such that less material may be removed during the lens layer material removal process.

Figure 7A:
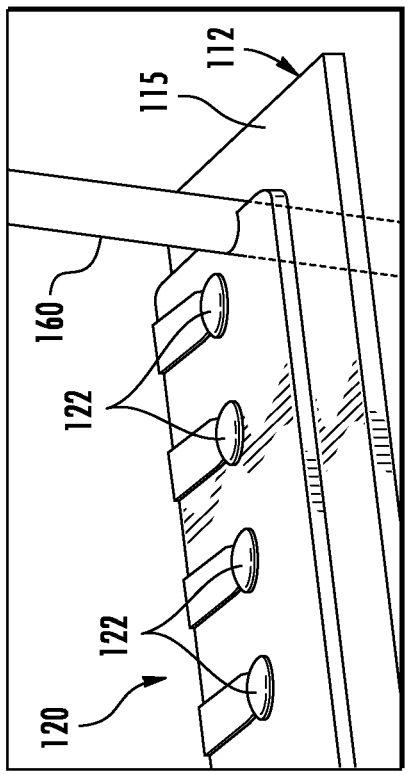
FIGS. 7A-7D schematically depict an individual lens being singulated from the lens layer by an example laser singulation process.
Figure 7B:
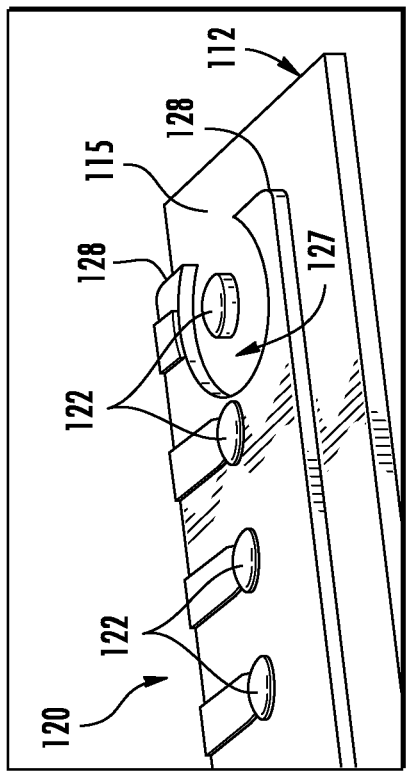

Referring now to FIGS. 7A-7D, laser singulation of the individual lenses 122 within a lens layer 120 coupled to a substrate 112 and formation of gap regions 127 is schematically illustrated. As shown in FIG. 7A, a laser beam 160 is incident on the second surface 115 of the substrate 112 and is passed through the lens layer 120 as depicted in FIG. 7B. Either the laser beam 160 is translated or the substrate 112 is translated such that the laser beam traverses around a perimeter of the lens 122 (e.g., by a translation table onto which the substrate 112 is coupled). In other embodiments, both the laser beam 160 and the substrate 112 may be translated to translate the laser beam 160 with respect to the substrate 112 and the lens layer 120.

The parameters of the laser beam 160 should be chosen such that it ablates the lens layer 120 material while leaving the substrate 112 substantially undamaged. In other words, the laser beam 160 should be configured such that it passes through the substrate 112 without causing damage to the substrate 112. Any suitable laser process may be utilized to ablate the lens layer material. For example, the laser beam may be brought to a focus on the lens layer 120. A pulsed laser or a continuous wave ("CW") may be utilized.

Figure 7C:
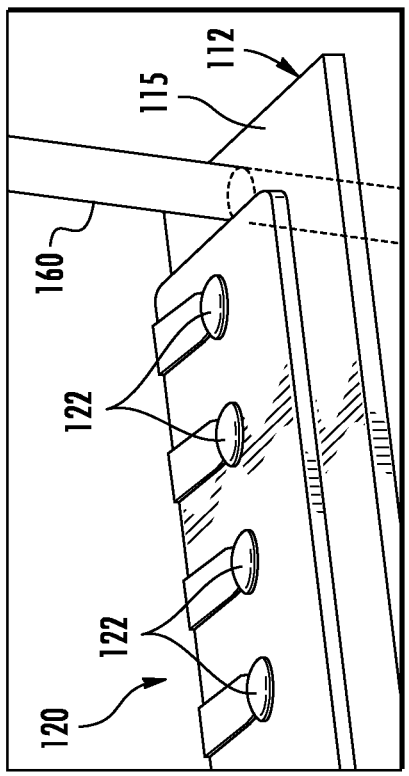
Figure 7D:
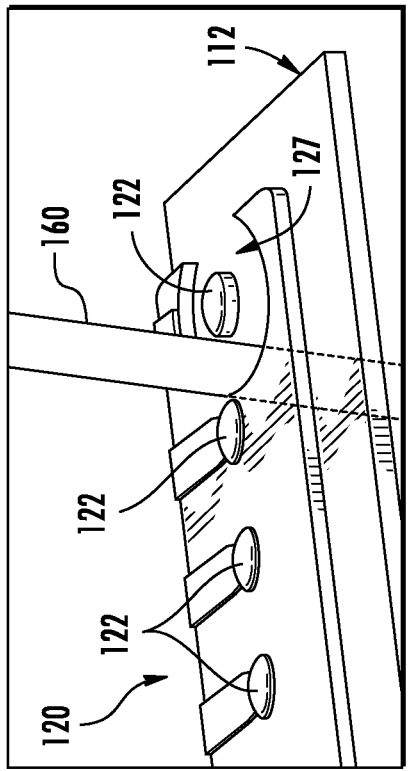

As shown in FIGS. 7C and 7D, in the example embodiment the laser beam 160 is translated completely around one of the lenses 122 within the lens layer 120 to remove polymer lens layer material and thereby form a gap region 127 that mechanically isolates a singulated lens from an adjacent lens. Each of the lenses 122 may be singulated in such a manner to provide mechanical isolation. It is noted that in some embodiments portions of lens layer material may remain on substrate 112 if such portions do not affect the accumulation of stress between lenses 122 (e.g., the material numbered 128). In other embodiments, all of the lens layer material outside of the lenses 122 may be removed.

Lens layer material may be removed from the substrate 112 by processes other than laser ablation. For example, the lens layer material may be removed by an etching process wherein a mask is applied to the lens layer material and then the lens assembly is subjected to an etchant solution that removes the lens layer material to singulate the lenses.

Figure 8:
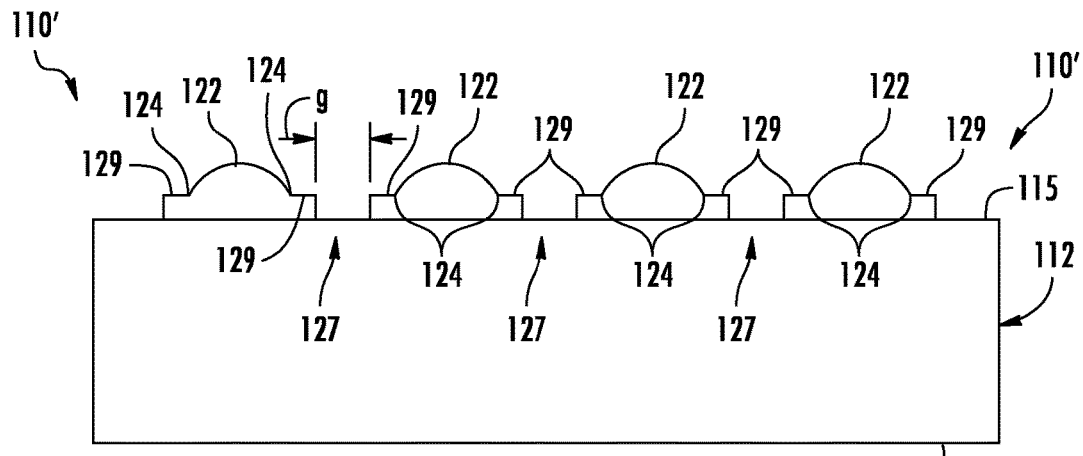
FIG. 8 is a side view of a plurality of example lenses coupled to a substrate wherein a portion of the lens layer material extends beyond the perimeter of each lens.

Referring now to FIG. 8, a side view of an exemplary lens assembly 110' having lenses 122 separated by gap regions 127 is depicted. In the embodiment illustrated in FIG. 8, portions 129 of lens layer material extend beyond a perimeter 124 of each lens 122. As stated above, in other embodiments all of the lens layer material except for the lenses 122 is removed from the substrate. The gap regions 127 should have a width g that prevents adjacent lenses 122 (as well as alignment features 125, if provided) from contacting one another over the operating temperature range.

Figure 9:
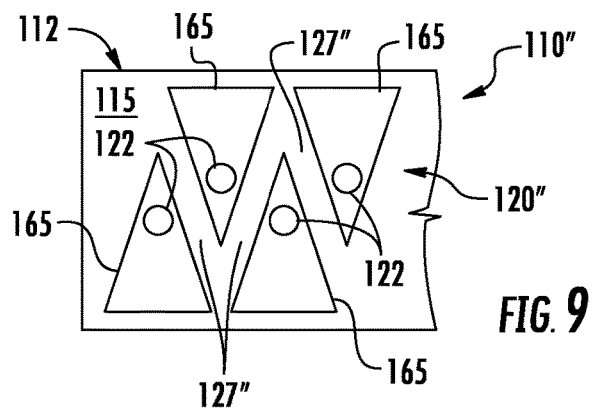
FIG. 9 is a top-down view of an example lens layer wherein the gap regions are such that each lens is disposed in a triangular portion of lens layer material.
Figure 10:
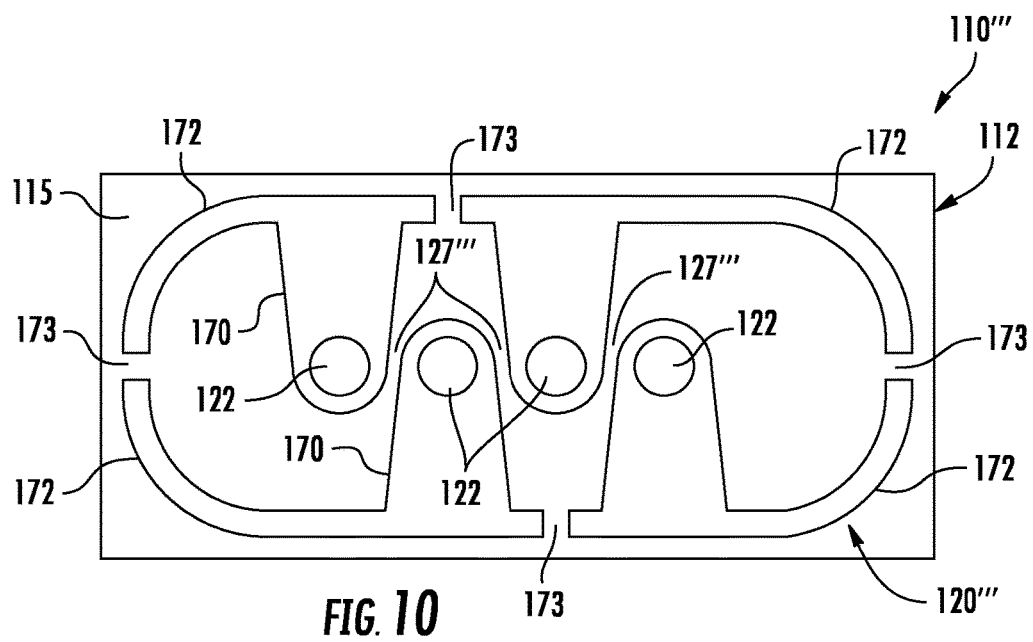
FIG. 10 is a top-down view of an example lens layer of a lens assembly wherein the gap regions are such that each lens is disposed in a tab and the lens layer includes a discontinuous perimeter web portion.

The gap regions that separate the individual lenses may take on any size or shape. The gap regions should be configured such that each lens does not influence adjacent lenses (or alignment features, if provided) due to expansion and contraction over the operating temperature range. FIGS. 9 and 10 depict several non-limiting, alternative lens layer configurations wherein the lenses are mechanically isolated from one another. It should be understood that the embodiments described herein are not limited to the configurations depicted in FIGS. 9 and 10, and that other configurations are also possible.

Referring to FIG. 9, a top-down view of a lens assembly 110" comprising a substrate 112 and a lens layer 120" is illustrated. The lenses 122 are arranged in two offset rows. In the illustrated embodiment, gap regions 127" are provided to separate the individual lenses 122 from one another. However, lens material outside of the lenses 122 remain on the second surface 115 of the substrate 112 such that the lenses 122 are disposed in triangular portions 165 of lens material. The gap regions 127" are such that the triangular portions 165 and the lenses 122 that they contain do not influence adjacent triangular portions 165. It should be understood that remaining portions of lens layer material may have shapes other than triangular.

Referring now to FIG. 10, a top-down view of another lens assembly 110' is illustrated. In embodiments, the lenses 122 of the lens layer 120' are disposed within interconnected tabs 170 of lens layer material. The tabs 170 are separated by gap regions 127' that are formed during the molding process. Accordingly, the gap regions 127' do not need to be formed during a subsequent lens layer material removal step.

In the illustrated embodiment, the tabs 170 are interconnected by a web portion 172 extending around a perimeter of the lens layer 120'''. The web portion 172 maintains integrity of the tabs 170 and associated lenses 122 so that the lens layer 120''' may be properly applied to the second surface 115 of the substrate 112 (e.g., by use of an adhesive). While the web portion 172 may have a width that is thin enough to mitigate expansion and contraction of the lenses 122, in some embodiments the web portion 172 may be severed at severed regions 173 to prevent CTE stress from affecting adjacent tabs 170 and associated lenses 122. The discontinuous web portion 172 may be severed by laser ablation as described above, or by other processes, such as mechanical processes (e.g., by use of a blade).

The severed regions 173 and the gap regions 127''' therefore mechanically isolate the individual lenses. Forming the gap regions 127''' during the molding process may reduce the amount of time to remove the lens layer material to isolate the individual lenses.

It should now be understood that embodiments described herein are directed to lens assemblies and optical connectors incorporating the same wherein mechanically isolated polymer lenses are bonded to a substrate such that the coefficient of thermal expansion mismatch between the polymer material of the lenses and the substrate does not affect the integrity of the bond between the lenses and the substrate nor does it affect alignment between the lenses and associated optical components. The substrate may be substantially CTE-matched to a substrate to which the optical components are coupled to minimize optical misalignment between the lenses and associated optical components.

It is noted that terms like "typically," when utilized herein, are not intended to limit the scope of the disclosure or to imply that certain features are critical, essential, or even important to the structure or function. Rather, these terms are merely intended to highlight alternative or additional features that may or may not be utilized in a particular embodiment.

For the purposes of describing and defining features it is noted that the terms "substantially" and "about" are utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A lens assembly comprising:
a substrate comprising a first surface; and
a plurality of lenses singulated on the substrate, wherein:
a coefficient of thermal expansion of the substrate is different from a coefficient of thermal expansion of the plurality of lenses;
the plurality of lenses is coupled to and disposed on the first surface of the substrate;
the plurality of lenses is provided in a lens layer, each lens is disposed in a tab extending from a perimeter of the lens layer, and the lens layer further comprises a discontinuous web portion; and
each lens of the plurality of lenses is mechanically isolated from adjacent lenses of the plurality of lenses by gap regions between each lens of the plurality of lenses.

2. The lens assembly of claim 1, wherein the coefficient of thermal expansion of the substrate is less than the coefficient of thermal expansion of the plurality of lenses.

3. The lens assembly of claim 1, wherein the plurality of lenses is made from an Ultem resin.

4. The lens assembly of claim 1, wherein the substrate is glass.

5. The lens assembly of claim 1, wherein portions of lens material extend beyond a perimeter of one or more individual lenses of the plurality of lenses.

6. The lens assembly of claim 1, further comprising at least one alignment feature coupled to the first surface of the substrate, and the plurality of lenses and the at least one alignment feature are made from the same material.

7. The lens assembly of claim 6, wherein the at least one alignment feature comprises a first alignment feature located on the first surface of the substrate at a first edge and a second alignment feature located on the first surface of the substrate at a second edge opposing the first edge.

8. An optical connector comprising:
a connector body comprising a mating face; and
a plurality of optical components aligned with the at least one connector alignment feature; and
a lens assembly disposed within the mating face, the lens assembly comprising:
a substrate comprising a first surface;
a plurality of lenses singulated on the substrate, wherein:
a coefficient of thermal expansion of the substrate is different from a coefficient of thermal expansion of the plurality of lenses;
the plurality of lenses is coupled to and disposed on the first surface of the substrate;
the plurality of lenses is provided in a lens layer, each lens is disposed in a tab extending from a perimeter of the lens layer, and the lens layer further comprises a discontinuous web portion; and
each lens of the plurality of lenses is mechanically isolated from adjacent lenses of the plurality of lenses by gap regions between each lens of the plurality of lenses.

9. The optical connector of claim 8, wherein the coefficient of thermal expansion of the substrate is less than the coefficient of thermal expansion of the plurality of lenses.

10. The optical connector of claim 8, wherein the plurality of lenses is made from an Ultem resin.

11. The optical connector of claim 8, wherein the substrate is glass.

12. The optical connector of claim 8, further comprising a plurality of active optical components mounted on a component substrate within the connector body, wherein the coefficient of thermal expansion of the substrate substantially matches a coefficient of thermal expansion of the component substrate.

13. The optical connector of claim 12, wherein the component substrate comprises silicon.

14. The optical connector of claim 12, wherein the component substrate is a circuit board.

15. The optical connector of claim 8, wherein:
the optical connector further comprises at least one connector alignment feature within the connector body;
the optical connector further comprises at least one alignment feature coupled to the first surface of the substrate;
the plurality of lenses and the at least one alignment feature is made from the same material; and
the at least one alignment feature is mated with the at least one connector alignment feature.

\* \* \* \* \*